(12) United States Patent
Elzur et al.

(10) Patent No.: US 8,458,305 B2
(45) Date of Patent: Jun. 4, 2013

(54) METHOD AND SYSTEM FOR MATCHING AND REPAIRING NETWORK CONFIGURATION

(75) Inventors: Uri Elzur, Irvine, CA (US); Hemal Shah, Trabuco Canyon, CA (US); Patricia Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 344 days.

(21) Appl. No.: 12/850,858

(22) Filed: Aug. 5, 2010

(65) Prior Publication Data

US 2011/0035474 A1 Feb. 10, 2011

Related U.S. Application Data

(60) Provisional application No. 61/231,726, filed on Aug. 6, 2009.

(51) Int. Cl.
*G06F 15/177* (2006.01)
*G06F 15/173* (2006.01)

(52) U.S. Cl.
USPC .......................................... 709/221; 709/223

(58) Field of Classification Search
USPC ................................................ 709/220–224
See application file for complete search history.

(56) References Cited

U.S. PATENT DOCUMENTS

| | | | | |
|---|---|---|---|---|
| 6,938,086 | B1* | 8/2005 | Banga | 709/227 |
| 2003/0069939 | A1* | 4/2003 | Russell | 709/214 |
| 2007/0050496 | A1* | 3/2007 | Fontijn et al. | 709/224 |
| 2007/0143471 | A1* | 6/2007 | Hicks et al. | 709/224 |
| 2009/0086642 | A1* | 4/2009 | Davis et al. | 370/242 |
| 2012/0198057 | A1* | 8/2012 | Ennis et al. | 709/224 |

* cited by examiner

*Primary Examiner* — Joshua Joo
(74) *Attorney, Agent, or Firm* — Brinks Hofer Gilson & Lione

(57) ABSTRACT

Aspects of a method and system for matching and repairing network configuration are provided. In this regard, one or more circuits and/or processors may be operable to determine a configuration of one or more parameters in a plurality of devices along a network path, and detect whether any of the one or more parameters are configured such that communication between the plurality of devices is disabled and/or suboptimal. The devices may comprise at least one server and one or more of a network switch, a network bridge, and a router. In instances that one or more parameters are incompatibly or sub-optimally configured, a notification of the incompatibility may be communicated to a network management entity and/or one or more messages may be generated to reconfigure the one or more parameters in one or more of the plurality of devices. The determining and/or detecting may be performed automatically in response to various events.

20 Claims, 5 Drawing Sheets

METHOD AND SYSTEM FOR MATCHING AND REPAIRING NETWORK CONFIGURATION

CROSS-REFERENCE TO RELATED APPLICATIONS/INCORPORATION BY REFERENCE

This patent application makes reference to, claims priority to and claims benefit from U.S. Provisional Patent Application Ser. No. 61/231,726 filed on Aug. 6, 2009.

This patent application also makes reference to:
U.S. patent application Ser. No. 12/619,221 filed on Nov. 16, 2009.

Each of the above stated applications is hereby incorporated herein by reference in its entirety.

FIELD OF THE INVENTION

Certain embodiments of the invention relate to networking. More specifically, certain embodiments of the invention relate to a method and system for network configuration.

BACKGROUND OF THE INVENTION

Information Technology (IT) management may require performing remote management operations of remote systems to perform inventory, monitoring, control, and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing and/or specific management methods and/or procedures. Management devices and/or consoles may communicate with devices in a network to ensure availability of remote systems, to monitor/control remote systems, to validate that systems may be up-to-date, and/or to perform any security patch updates that may be necessary. As networks become increasingly large and complex, network management also becomes increasingly complex.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for matching and repairing network configuration, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for matching and repairing network configuration. In various embodiments of the invention, one or more circuits and/or processors may be operable to determine a configuration of one or more parameters in a plurality of devices along a network path, and detect whether any of the one or more parameters is configured such that communication between the plurality of devices is disabled and/or sub-optimal. In some instances, parameters that are configured such that they are compatible with each other may be said to be "matched," whereas parameters which may be configured such that they are incompatible with each other may be said to be "mismatched." In instances that one or more parameters are incompatibly or sub-optimally configured, the one or more circuits and/or processors may communicate a notification of the incompatibility to a network management entity and/or generate one or more messages to reconfigure the one or more parameters in one or more of the plurality of devices. In some instances, reconfiguring one or more parameters such that they are matched and/or optimally configured may be said to be "repairing" network configuration. The determining, detecting, matching, and repairing may be performed automatically in response to a change in one or more of the parameters in one or more of the plurality of devices. The determining, detecting, matching, and repairing may be performed automatically in response to a reconfiguration of the network path. The notification may comprise a recommended configuration of the one or more parameters in one or more of the plurality of devices. The one or more circuits and/or processors may enable access to one or more application programming interfaces of one or more of the plurality of devices. The one or more circuits and/or processors may be operable to translate between the one or more application programming interfaces and one or more network interfaces.

The one or more circuits and/or processors may be operable to manage configuration of the one or more parameters in a first portion of the plurality of devices. The one or more circuits and/or processors may be operable to communicate with one or more other circuits and/or processors that manage configuration of the one or more parameters in a second portion of the plurality of devices. The one or more circuits and/or processors may be operable to automatically perform the determining and/or detecting in response to a communication from the one or more other circuits and/or processors. Incompatibilities between parameters in the first portion of the plurality of devices and parameters in the second portion of the plurality of network devices may be reconciled via communications between the one or more circuits and/or processors and the one or more other circuits and/or processors.

Figure 1:
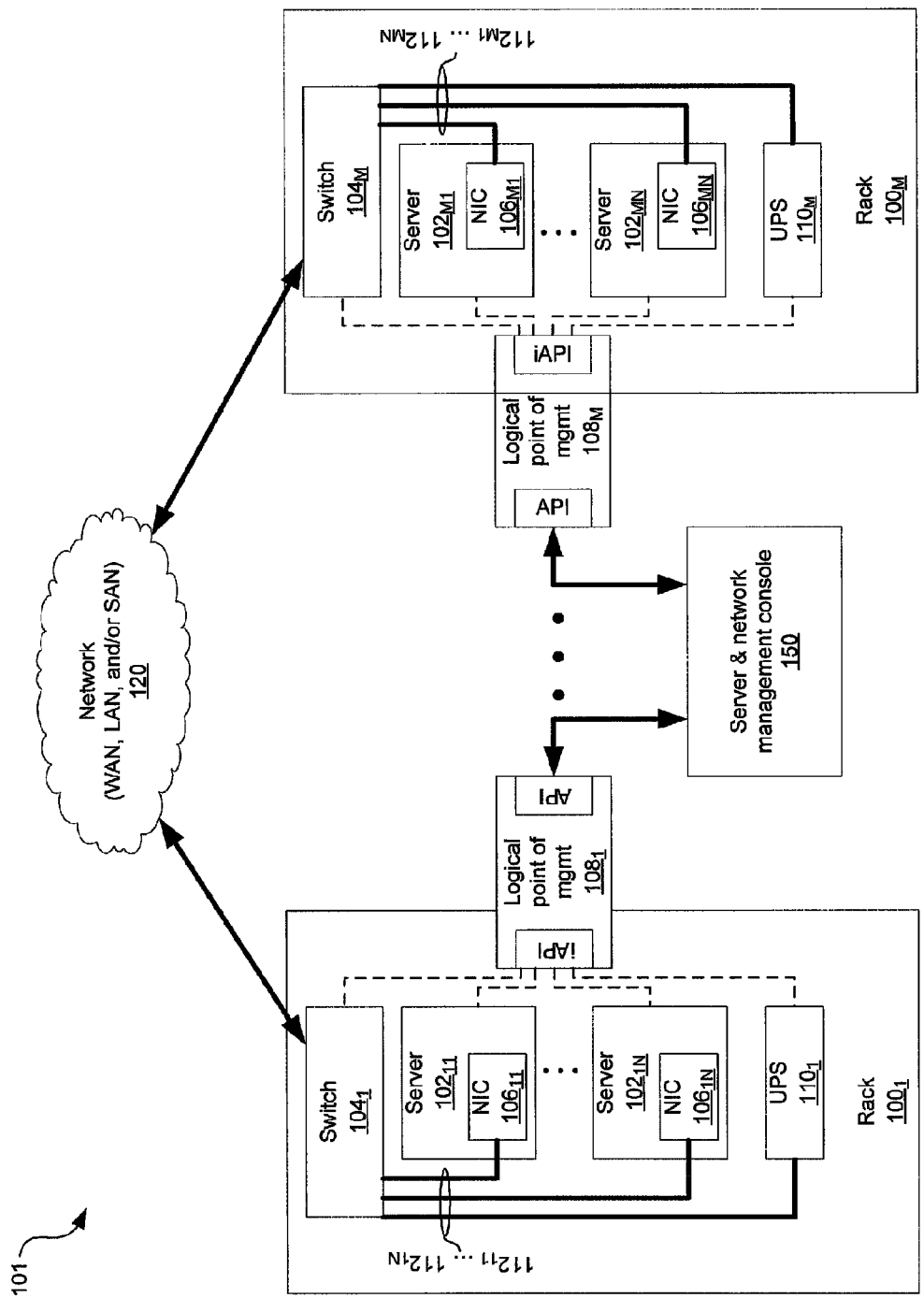
FIG. 1 is diagram illustrating an exemplary network in which multiple devices and/or portions of devices are configured via a single logical point of management (LPM), in accordance with an embodiment of the invention.

FIG. 1 is diagram illustrating an exemplary network in which multiple devices and/or portions of devices are configured via a single logical point of management (LPM), in accordance with an embodiment of the invention. Referring to FIG. 1 there is shown a network 101 comprising subnetwork 120, a management console 150, logical points of management (LPMs) $108_1$-$108_M$, and racks or cabinets $100_1$-$100_M$, where 'M' is an integer greater than or equal to 1.

The network 101 may comprise a plurality of link layer technologies such as Ethernet, Fiber Channel, and Infiniband. In an exemplary embodiment of the invention, the network 101 may utilize one or more data center bridging (DCB) techniques and/or protocols such as Congestion Notification (CN), Priority Flow Control (PFC), and Enhanced Transmission Selection (ETS).

The racks $100_1$-$100_M$ may comprise rack mount networking systems that may house, for example, computing devices such as servers and computers, and network devices such as switches, and/or other devices such as power supplies. In this regard, the term "computing" device is utilized herein to describe a device, such as a server, which is conventionally managed by a first management entity and/or utilizing a first set of management protocols and/or tools. Similarly, the term "network" device is utilized herein to describe a device, such as an Ethernet switch, which is conventionally managed by a second management entity and/or utilizing a second set of management protocols and/or tools. However, in practice, the line between a "network" device and a "computing" device is becoming increasingly blurry. For example, a virtual switch residing in a server may, depending on the circumstances, be referred to by either or both terms. Similarly, other devices such as the UPS $110_X$ or displays (not shown), may comprise various functionalities which may result in them being considered as computing devices and/or network devices. Accordingly, "computing" devices, "network" devices, and other devices are referred to collectively and individually herein as simply "devices." Furthermore, aspects of the invention may enable simplifying and/or unifying management of various devices, particularly in instances when multiple management entities need, or desire, to manage various devices and/or portions thereof.

Each rack $100_m$ may comprise 'N' servers $102_{m1}$-$102_{mN}$, where 'N' is an integer greater than or equal to 1 and 'm' is an integer between 1 and 'M.' The servers $102_{m1}$-$102_{mN}$ of rack $100_m$ may each comprise suitable logic, circuitry, interfaces, and/or code that may be operable to provide services to clients such as PCs, mobile devices, and other servers. Each of the servers $102_{m1}$-$102_{mN}$ may be operable to, for example, run one or more applications that processes input from the clients and/or output information to the clients.

Each of the servers $102_{m1}$-$102_{mN}$ may interface with the network via a corresponding one of network interface circuits (NICs) $106_{m1}$-$106_{mN}$. The NICs $106_{m1}$-$106_{mN}$ of the rack $100_m$ may each comprise suitable logic, circuitry, interfaces, and/or code that may be operable to interface the corresponding servers $102_{m1}$-$102_{mN}$ to the switch $104_m$.

Each rack $100_m$ may also comprise a switch $104_m$. Each of the switches $104_1$-$104_M$ may comprise suitable logic, circuitry, interfaces, and/or code that may be operable to forward packets between corresponding NICs $106_1$-$106_N$, other ones of the switches $104_1$-$104_M$, and other networks and/or storage area networks, such as the subnetwork 120.

Each logical point of management (LPM) $108_m$ may comprise suitable logic, circuitry, interfaces, and/or code that may enable managing configuration of one or more devices with which it is associated. Each LPM $108_m$ may comprise, for example, one or more processors, memory devices, and bus controllers. Each LPM $108_m$ may comprise, for example, dedicated, shared, and/or general purpose hardware and/or may comprise firmware and/or software executed by dedicated, shared, and/or general purpose hardware. Each LPM $108_m$, or portions thereof, may reside in various places. For example, for a rack $108_m$, portions of the LPM $108_m$ may reside in the switch $104_m$, in one or more of the servers $102_{m1}$-$102_{mN}$, in one or more of the NICs $106_{m1}$-$106_{mN}$, on the rack itself, or a combination thereof. In various embodiments of the invention, each LPM 108m may be similar to or the same as a central management unit (CMU) described in U.S. patent application Ser. No. 12/619,221, which is incorporated by reference above.

In the exemplary embodiment of the invention depicted in FIG. 1, each rack $100_m$ may comprise a LPM $108_m$, such that all the devices of each rack $100_m$ may be associated with, and managed via, a corresponding LPM $108_m$. As a result, the rack servers $102_{m1}$-$102_{mN}$, the NICs $106_{m1}$-$106_{mN}$, the switch $104_m$, and the UPS $110_m$ may be managed via the LPM $108_m$. Additionally, in some instances, devices external to the rack $100_m$, such as devices (not shown) residing in the subnetwork 120, may be associated with, and thus managed via, a LPM $108_m$.

Each LPM $108_m$ may enable management of associated devices by, for example, exposing one or more application programming interfaces (APIs) of the associated devices to one or more network management entities such as the console 150. In this regard, each LPM $108_m$ may be operable to translate between one or more APIs and one or more network interfaces. For instance, each LPM $108_m$ may be operable to receive a command or request over a network interface and may de-packetize, convert, reformat, and/or otherwise process the command or request to generate a corresponding command or request on one or more APIs to one or more devices.

In the exemplary embodiment of the invention depicted in FIG. 1, each LPM $108_m$ may expose an internal API of the rack $108_m$ to the one or more management consoles 150.

In operation, each LPM $108_m$ may collect configuration information from its associated devices, make the information available among the associated devices, and make the information available to the management console 150. Similarly, each LPM $108_m$ may receive configuration information from the management console 150 and/or other LPMs $108_m$ and distribute or make available the received configuration information among the devices associated with the LPM $108_m$. Such exchanged configuration information may be utilized to ensure that devices are compatibly and/or optimally configured to enable and/or optimize communications in the network 101. In this regard, parameters in various devices of the network 101 may be configured based on information communicated to, from, and/or between the LPMs $108_1$-$108_M$.

Whether various parameters are compatible, or how to make parameters compatible, may vary with the parameters and the circumstances. For example, one or more parameters in a first device may be compatible with one or more corresponding parameters in a second device when the parameters in the first device have the same values as the corresponding parameters in the second device. As another example, one or more parameters in a first device may be compatible with one or more corresponding parameters in a second device when the parameters in the first device are configured to have values associated with transmission and the corresponding parameters in the second device are configured to have values associated with reception. Whether parameters are compatible may be characterized by, for example, whether messages that utilize or depend on the parameters can be successfully communicated. Similarly, whether parameters are optimal may be characterized by, for example, a data rate and/or error rate that may be achieved in communications that utilize or depend on those parameters.

An exchange of configuration information to validate a configuration of, and/or reconfigure, one or more devices, may occur upon, for example, one or more of: a change in network topology (e.g., addition, removal, power up, or power down of a device), a change in one or more parameters, a request from a management console 150, and reception of configuration information at an LPM $108_m$ from another one of the LPMs $108_1$-$108_m$ or from a management entity. In this regard, various events may automatically trigger a collection of configuration information, an exchange of configuration information, and/or a reconfiguration of one or more devices.

The exchanged information may ensure link partners and devices along a network path are compatibly configured to enable and/or optimize communication along the respective link(s) and path(s). For example, one or more parameters in the servers $102_{11}$ and/or NICs $106_{11}$ may need to match, or be compatible with, a corresponding one or more parameters in the switch $104_1$ to enable and/or optimize communication between the switch $104_1$ and the server $102_{11}$. That is, if parameters in the server $102_{11}$ and/or NIC $106_{11}$ and the switch $104_1$ are incompatibly configured, then communication over the corresponding link $112_{11}$ may fail or be sub-optimal. In this example, the server $102_{11}$, the NIC $102_{11}$, and the switch $104_1$ may all be associated with a single LPM $108_1$, however, multiple LPMs may interact to achieve the same results. To elaborate, the LPM $108_1$ and the LPM $108_M$ may exchange information with each other and/or with one or more management consoles 150 to ensure link partners and/or devices along a network path are compatibly and/or optimally configured. For example, the server $102_{11}$ may need or desire to communicate with the server $102_{1M}$. As a result, one or more parameters in the server $102_{11}$ or NIC $106_{11}$, one or more parameters in the server $102_{1M}$ or NIC $106_{1M}$, and one or more corresponding parameters in any switches, routers, or other intermediary devices between the server $102_{11}$ and the server $102_{1M}$ may need to be compatibly configured to enable and/or optimize communication along the path. Accordingly, the LPM $108_1$, the LPM $108_M$, and any LPM(s) associated with any intermediary device(s) (if such intermediary devices are present, and if such devices are not associated with either of the LMP $108_1$ and $108_M$) may exchange configuration information, with each other and/or with one or more management consoles, to ensure compatible and/or optimal configuration along the network path between server $102_{11}$ and server $102_{1M}$.

In an exemplary embodiment of the invention, in instances that an exchange of configuration information results in a detection that one or more parameters are incompatibly configured, one or more of LPMs $108_1$-$108_M$ may generate a notification to another one or more of the LPMs $108_1$-$108_M$ and/or to one or more management entities, such as the console 150. The notification may comprise, for example, current configuration, possible compatible configurations, and/or a recommended configuration. In this manner, current configuration and/or recommended configuration may be presented to, for example, management software and/or to a network administrator who may view the information and make management decisions based on the notification. In instances that there are multiple management entities, the management entities may then negotiate with each other to determine how to configure the devices. The management entities may then reconfigure one or more parameters to eliminate the incompatibility. The configuration by the management entities may be performed utilizing standard management protocols and/or tools and/or via the LPMs $108_1$-$108_M$.

In an exemplary embodiment of the invention, in instances that an exchange of configuration information results in a detection that one or more parameters are mismatched or sub-optimally configured, the corresponding ones of the LPMs $108_1$-$108_M$ may automatically reconfigure the parameters into a best-possible configuration. In such instances that LPMs interact to automatically reconfigure one or more parameters, one LPM 108 may act as a master while others may act as a slave. Which device is master and which is slave may be determined on a per-parameter, per-link, per-connection, per-network, per-function, and/or on any other basis.

In various embodiments of the invention, configuration compatibility may be determined per link and/or end-to-end for various parameters. Exemplary parameters may comprise: virtual local area networking (VLAN) identifiers and/or other VLAN parameters; teaming parameters; MAC addresses; parameters regarding data rates supported and/or utilized; parameters regarding whether communications are to be simplex, duplex, and/or unidirectional; an indication of whether or not IEEE 802.3 PAUSE is to be enabled; energy efficient networking (EEN) or energy efficient Ethernet (EEE) parameters, and parameters regarding supported and/or expected formatting of packets. Also, the parameters may be associated with data center bridging (DCB) policies and/or settings such as: whether priority flow control (PFC) support is enabled, a number of priority classes utilized for PFC, number of lossless priority classes, whether ETS is enabled; whether and how quantized congestion notification (QCN) is supported, whether and how iSCSI is supported, whether and how Fiber Channel over Ethernet (FCoE) is supported, the maximum transmission unit (MTU) supported for a lossless priority, the maximum MTU for all priorities, whether and how a lossless performance mode is supported.

In some embodiments of the invention, FCoE, iSCSI, or other protocols that require lossless communication may be utilized. Accordingly, aspects of the invention may enable ensuring that support of lossless behavior is compatibly configured among link partners and end-to-end. In some instances, if a mismatch (either among link partners or at some point along an end-to-end path) is detected because a NIC $106_{XY}$ does not support lossless behavior but a corresponding switch $104_X$ does, then IEEE 802.3 PAUSE may be enabled on the link between the NIC $106_{XY}$ and the switch $104_X$.

In the exemplary embodiment of the invention depicted in FIG. 1, the network 101 comprises an LPM 108 for each of the racks $101_1$-$101_M$. However, the network 101 and racks $100_1$ and $100_M$ are for illustration purposes only and the invention is not limited with regard to network topology, the particular devices within a network, the particular devices within a Rack, and/or the particular devices managed by an associated LPM 108.

Figure 2A:
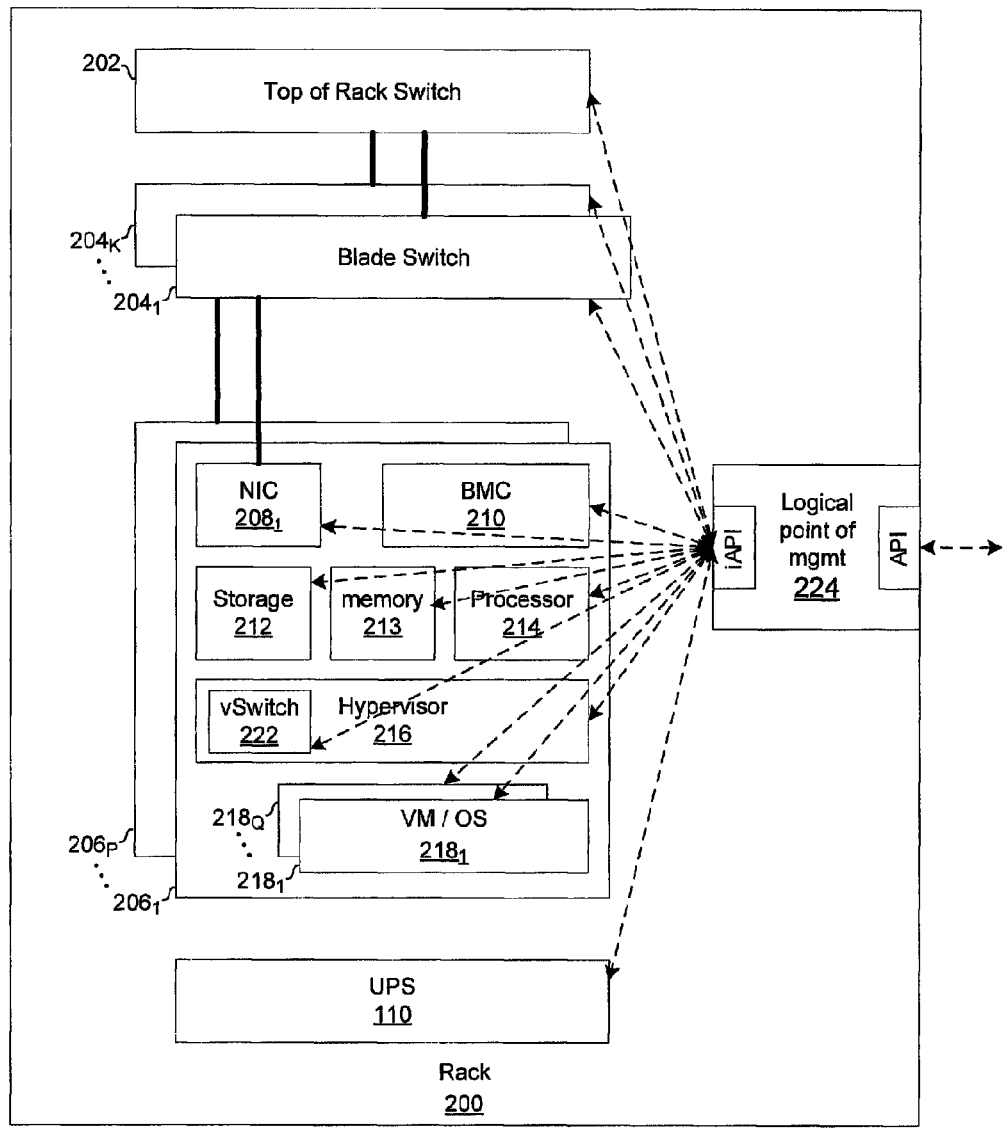
FIG. 2A is a diagram illustrating exemplary devices managed via a logical point of management (LPM), in accordance with an embodiment of the invention.

FIG. 2A is a diagram illustrating exemplary devices managed via a logical point of management (LPM), in accordance with an embodiment of the invention. Referring to FIG. 2A, there is shown a server rack 200 comprising a variety of components including a LPM 224, a top-of-rack (TOR) switch 202, blade switches $204_1$-$204_K$, UPS 110, and servers $206_1$-$206_P$, where K and P are integers greater than or equal to 1. Each of the servers $206_1$-$206_P$ may comprise a variety of components such as a network interface circuit (NIC) 208, a baseboard management controller (BMC) 210, storage 212, memory 213, a processor 214, a hypervisor 216, a virtual switch (vSwitch) 222, and virtual machines and/or operating systems (VMs/OSs) $218_1$-$218_Q$, where Q is an integers greater than or equal to 1.

The LPM 224 may be substantially similar to the LPMs $108_m$ described with respect to FIG. 1. In various exemplary embodiments of the invention, the LPM 224 may be implemented via any combination of dedicated and/or shared logic, circuitry, interfaces, and/or code that resides anywhere on or within the Rack 200. In the exemplary embodiment of the invention depicted in FIG. 2A, the LPM 224 is implemented in dedicated logic, circuitry, interfaces, and/or code residing on the rack 200 separately from the servers 206, the blade switches 204, and the TOR switch 202.

The NIC 208 may comprise suitable logic, circuitry, interfaces, and/or code that may be operable to transmit and receive data in adherence with one or more networking standards. With reference to the OSI model, the NIC 208 may implement physical layer functions, data link layer functions, and, in some instances, functions associated with OSI layer 3 and higher OSI layers. Similarly, with reference to the TCP/IP model, the NIC 208 may be operable to implement network interface layer functions, Internet layer functions, and, in some instances, transport layer functions and application layer functions. The NIC 208 may, for example, communicate in adherence with one or more Ethernet standards defined in IEEE 802.3. The NIC 208 may be enabled to utilize virtualization such that it may present itself as multiple network adapters.

The BMC 210 may comprise suitable logic, circuitry, interfaces, and/or code that may be operable to monitor various conditions on the corresponding server 206, and control various functions and/or hardware components of the corresponding server 206 based on the monitored conditions. For example, the BMC 210 may receive data from one or more sensors and determine that the server 206 needs to be reset based on the sensor data. As another example, the BMC 210 may monitor temperature of the server 206 and adjust fan speed accordingly. The BMC 210 may also comprise suitable logic, circuitry, interfaces, and/or code that may be operable communicate with a management entity via an internal data bus and/or a network link. For example, a management entity may request a status report from the BMC 210, and, in response, the BMC 206 may gather information from various sensors and communicate the information to the management entity.

The storage 212 may comprise, for example, a hard drive or solid state memory. The storage 212 may store, for example, data that may be read, written, and/or executed locally or remotely via the NIC 208.

The processor 214 and the memory 213 may comprise suitable logic, circuitry, interfaces and/or code that may enable processing data and/or controlling operations of the server 206. The memory 213 may comprise, for example, SRAM, DRAM, and/or non-volatile memory that stores data and/or instructions. The processor 214, utilizing the memory 213, may be operable to execute code to effectuate operation of the server 206. For example, the processor 214 may execute code stored in the memory 213 to realize the hypervisor 216 and the VMs/OSs 218.

In operation, a configuration of any one or more of the TOR switch 202, the blade switches $204_1$-$204_K$, and any one or more components of any one or more of the servers $206_1$-$206_P$ may be managed via the LPM 224. In this regard, the LPM 224 may be operable to determine a configuration of one or more parameters in any one or more components of the rack 200 and may be operable to determine. For instance, if one or more parameters in the blade switch $204_1$ is configured incompatibly with one or more parameters in the NIC 208 of the server $206_1$, then traffic to and/or from the server $206_1$ may be impossible or sub-optimal. Similarly, if a remote client (not shown) requests a datastream from the VM/OS $218_1$ of the server $206_1$ but one or more parameters in the vSwitch 222 of the server $206_1$ is incompatibly or sub-optimally configured with one or more corresponding parameters in the NIC 208 of server $206_1$, the blade switch $204_1$, and/or in the remote client, then the datastream may not be communicated or may be communicated sub-optimally. In instances that one or more parameters are incompatible or sub-optimal, messages may be exchanged between the LPM 224 and a LPM associated with the remote client automatically reconfigure the parameter(s) and/or notify one or more management entities, based on network and/or device policies or settings. Reconciliation of one or more incompatible parameters may depend, for example, on an order of precedence, or hierarchy, of LPMs and/or management entities. For example, in resolving conflicts in parameter configuration, the decisions of certain management entities may control over the decisions of other management entities and/or decisions of certain LPMs may control over the decisions of other LPMs.

The LPM 224 may determine and/or configure parameters of various components of the rack 200 via one or more data busses, such as a PCI-X bus. Additionally or alternatively, the LPM 224 may determine and/or configure parameters of various components of the rack 200 via one or more network connections, such as an Ethernet connection. For example, in an exemplary embodiment of the invention, the LPM 224 may manage various components of the server $206_1$ utilizing Ethernet packets communicated via the TOR switch 202 and the blade switch $204_1$. In such an embodiment, a portion of the LPM 224 may comprise an agent, for example, a virtual machine or software agent, running on the server $206_1$ such that the agent may be operable to receive, process, implement, generate, and/or transmit configuration messages. In this regard, the agent may be operable to collect configuration information from various components of the server, generate one or more network messages, for example, an Ethernet frame, comprising the configuration information, and communicate the message(s) to another portion of the LPM 224 and/or to a management entity, such as the console 150 described with respect to FIG. 1.

Figure 2B:
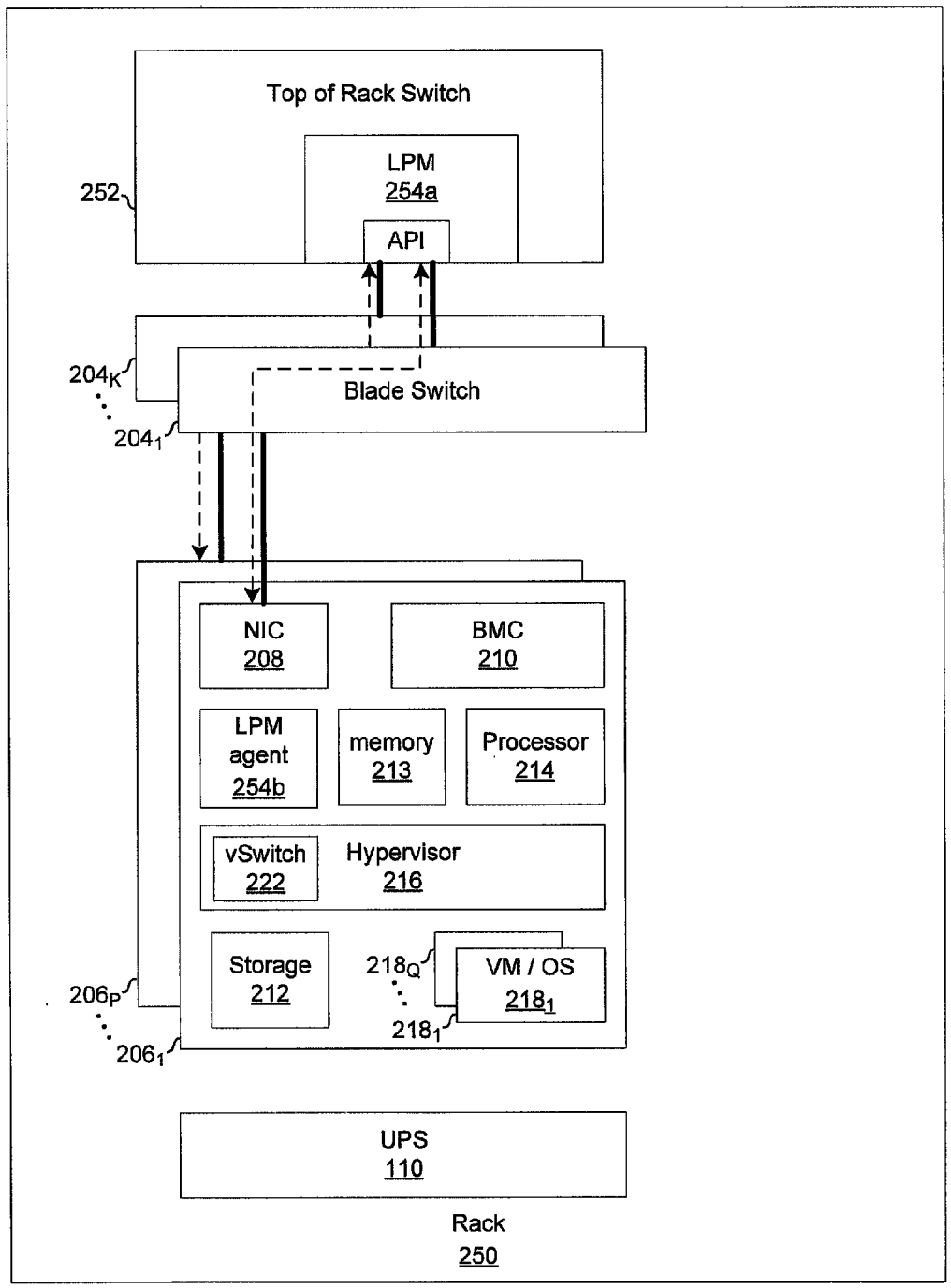
FIG. 2B is a diagram illustrating exemplary devices managed via a logical point of management (LPM) integrated into a top-of-rack switch, in accordance with an embodiment of the invention.

FIG. 2B is a diagram illustrating exemplary devices managed via a logical point of management (LPM) integrated into a top-of-rack switch, in accordance with an embodiment of the invention. The Rack 250 of FIG. 2B may be substantially similar to the rack 200 described with respect to FIG. 2B.

In the exemplary embodiment of FIG. 2B, a potion 224a of the LPM resides in the TOR switch 252 and a portion 224b resides in each server 206. The portion 224a may communicate over one or more network links, for example, Ethernet links, with one or more management entities such as console 150 (FIG. 1), and may communicate with each of the servers $206_1$-$206_P$ via one or more network links internal to the rack 250. The portion 224b may comprise, for example, a software agent. Each portion 224b on each of the servers $206_1$-$206_P$ may receive packets from the portion 224a and generate corresponding signals and/or commands on the corresponding server 206 to implement and/or respond to requests and/or commands contained in the received packets.

In an exemplary operation, a management entity may send a request for configuration information to the LPM 224a. The LPM 224a may send corresponding requests to the agents 224b. Each agent may collect the configuration information for its respective server 206 and report such information to the portion 224a. The portion 224a may then aggregate the configuration and report the information to the management entity.

In an exemplary operation, a portion 224b may detect a change in one or more parameters in the server 206 on which it resides. The portion 224b may report this change to the portion 224a which may determine whether the new configuration is incompatible with one or more parameters on any of the other servers 206 and/or with one or more devices external to the server 206. In some instances, if there is an incompatibility internal to the rack 250, the portion 224b may automatically reconfigure one or more of the parameters to reconcile the incompatibility. In some instances, if there is an incompatibility and/or sub-optimal configuration internal to the rack 250, the portion 224b may send a notification of the incompatibility and/or sub-optimal configuration to a management entity. The notification may comprise a possible and/or recommended reconfiguration to optimize the configuration and/or eliminate the incompatibility. In some instances, if there is an incompatibility and/or sub-optimal configuration with respect to a device that is external to the rack 250, the portion 224b may communicate with a LPM associated with the external device to optimize the configuration and/or reconcile the incompatibility.

Figure 3:
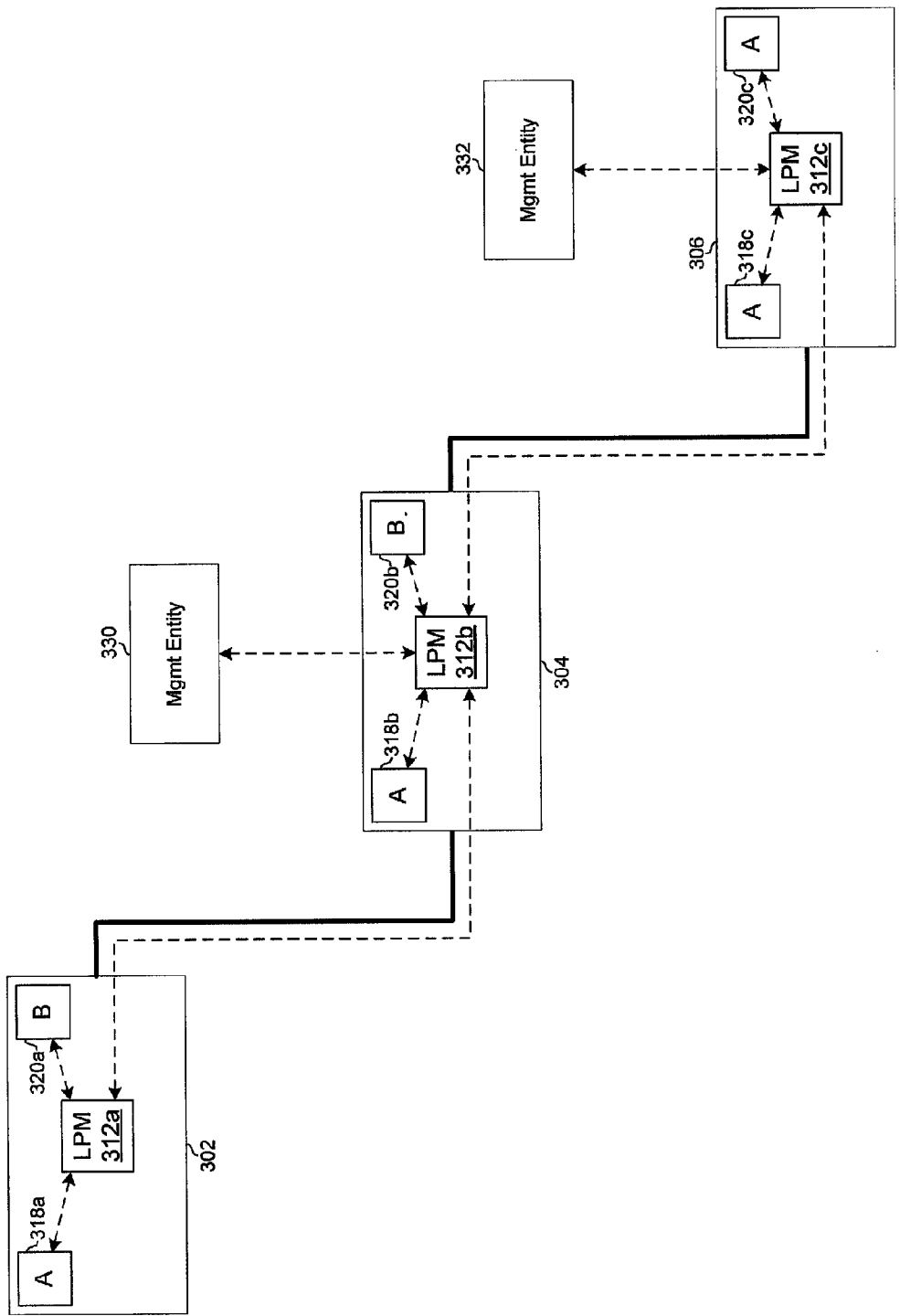
FIG. 3 illustrates configuration of devices along a network path, in accordance with an embodiment of the invention.

FIG. 3 illustrates configuration of devices along a network path, in accordance with an embodiment of the invention. Referring to FIG. 3, there is shown a network path comprising devices 302, 304, and 306. Each of the devices 302, 304, and 306 comprises parameters 318 and 320. The management entities 332 and 334 may be the same as the console 150 described with respect to FIG. 1. In an exemplary embodiment of the invention, the device 302c may comprise a server, the device 302b may comprise a switch, and the device 302a may comprise a personal computer.

In operation, communication may be desired between devices 302 and 306, and enabling and/or optimizing such communication may require that the parameters 318 and 320 be compatibly configured in each of the devices 302, 304, and 306. For illustration, to enable and/or optimize delivery of a media stream from the device 302 to the device 306 each of the parameters 318 and 320 may need to be set to 'A.'

Accordingly, configuration information, as indicated by dashed lines, may be communicated among the LPMs 312a, 312b, and 312c and/or the management entities 332 and 334. In this regard, the LPM 312a may collect the current configuration of the parameters 318a and 320a, the LPM 312b may collect the current configuration of the parameters 318b and 320b, and the LPM 312c may collect the current configuration of the parameters 318c and 320c, and then the LPMs 312a, 312b, and 312c may exchange the collected configuration information. Upon receiving the configuration information from other LPMs, one or more of the LPMs 312a, 312b, and 312c and/or the management entities 332 and 334 may inspect the information to detect any incompatibilities or sub-optimal configurations. In the exemplary embodiment of the invention, it may be detected that parameters 320a, 320b, and 320c are incompatibly configured.

Upon detection, the incompatibility may be resolved in variety of ways. The LPMs 312a, 312b, and 312c may, for example, automatically determine a compatible configuration to enable and/or optimize communication of the media stream. In this regard, the LPMs 312a, 312b, and 312c may negotiate and/or one of LPMs 312a, 312b, and 312c may take precedence over the other ones of the LPMs 312a, 312b, and 312c to reconcile the incompatibility and resolve any conflicts. Similarly, the management entities 330 and 332 may negotiate to resolve the conflict, or if one of the management entities 330 and 332 takes precedence over the other, then that management entity may decide how to resolve the incompatibility.

In an exemplary embodiment of the invention, the LPMs 312b may have priority, for example, be a "master, and may decide that the optimum configuration is to reconfigure parameters 320a and 320b to a value of 'A.' Accordingly, the LPM 312b may reconfigure 320b to 'A', send a command to LPM 312a to reconfigure 320a to a value of 'A,' and then notify the LPM 312c and/or the management entity 332 the reconfiguration. The LPM 312c may then notify the management entity 334.

In an exemplary embodiment of the invention, the management entity 330 may decide that the optimum configuration is to reconfigure parameters 320a and 320b to a value of 'A.' Accordingly, the management entity 330 may communicate such a decision to the LPM 314. In response, the LPM 314 may reconfigure 320b to 'A,' send a command to LPM 312a to reconfigure 320a to a value of 'A,' and then notify the LPM 312c and/or the management entity 332 the reconfiguration. The LPM 312c may then notify the management entity 334. In this manner, the single management entity may need only submit configuration parameters once to the LPM 312b and configuration of the entire network path may occur as a result of that single message.

Although FIG. 3 depicts an LPM associated with each of the devices 302, 304, and 306, the invention is not so limited. For example, each of devices 302, 304, 306 may represent a plurality of devices. Similarly, the LPMs 312a, 312b, and 312c may each correspond to portions, logical and/or physical, of a single LPM. In this regard, an LPM 312 may be distributed and/or virtualized across multiple devices.

Figure 4:
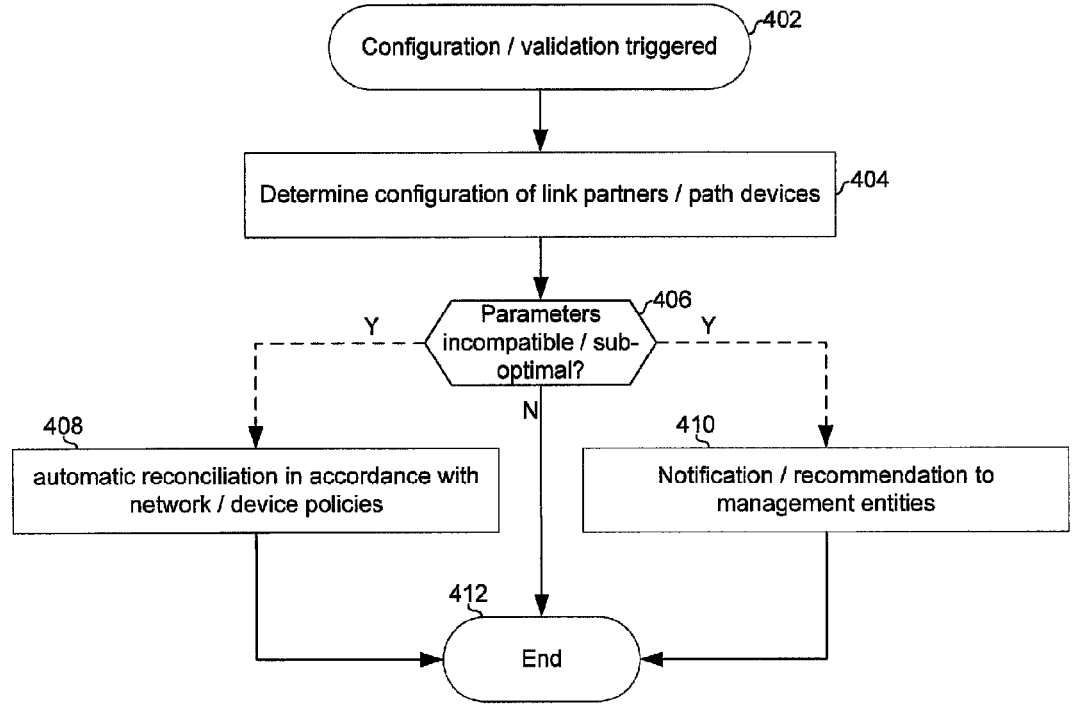
FIG. 4 is a flow chart illustrating exemplary steps for network configuration, in accordance with an embodiment of the invention.

FIG. 4 is a flow chart illustrating exemplary steps for network configuration, in accordance with an embodiment of the invention. Referring to FIG. 4, the exemplary steps may begin with step 402 when configuration, or validation of configuration, is triggered for link partners and/or devices along a network path. Exemplary triggers may comprise, for example, a change in one or more parameters, a command or request from a management entity, a reconfiguration of a network such as a device added, removed, powered up, or powered down, and a request to, or attempt to, establish a network path such as an attempt to setup a path utilizing Audio Video Bridging protocols such as IEEE 802.1Qat, IEEE 802.1Qav, IEEE 802.1AP, or similar or related protocols. Subsequent to step 402, the exemplary steps may advance to step 404.

In step 404, the one or more LPMs associated with the devices to be validated and/or configured may obtain the current configuration of the devices and may determine whether any parameters are incompatibly configured with one or more corresponding parameters in other devices of the network path. In instances that the parameters are optimally configured, the exemplary steps may advance to end step 412. Returning to step 406, in instances that one or more parameters in one or more of the devices are mismatched and/or sub-optimal, the exemplary step may, depending on the network policies, circumstances, and/or other implementation details, advance to step 408 and/or step 410.

In step 408, the LPM(s) may automatically reconfigure one or more of the devices, based on factors such as the nature of the parameter(s) that are mismatched and/or sub-optimal, whether current configuration results in no communication or just reduced communication, the types of the devices, security levels of the devices, effect of the parameters on other network paths or other network or device functions, any other policy or setting that may be established by network administrators.

In step 410, the LPM that detects the mismatched and/or sub-optimal configuration may generate a notification to other LPMs and/or to one or more network management entities. The notification may comprise a recommendation as to how to optimize the configuration and/or repair the mismatch. A network management entity (e.g., a automated or manned management console) may utilize the notification and/or recommendation to determine how to optimize configuration.

Various aspects of a method and system for matching and repairing network configuration are provided. In an exemplary embodiment of the invention, one or more circuits and/or processors, such as any of LPMs 312a, 312b, and 312c or a combination thereof, may be operable to determine a configuration of one or more parameters 318 and 320 in devices 302, 304, and 306 along a network path, and detect whether any of the one or more parameters 318 and 320 is configured such that communication between the devices 302, 304, and 306 is disabled and/or suboptimal. In some instances, parameters that are configured such that they are compatible with each other may be said to be "matched," whereas parameters which may be configured such that they are incompatible with each other may be said to be "mismatched." In instances that one or more parameters 318 and/or 320 are incompatibly or sub-optimally configured, the one or more circuits and/or processors may communicate a notification of the incompatibility to a network management entity 150 and/or generate one or more messages to reconfigure one or more of the parameters 318 and/or 320 in one or more of devices 302, 304, and 306. In some instances, reconfiguring one or more parameters such that they are matched and/or optimally configured may be said to be "repairing" network configuration. The determining, detecting, matching, and repairing may be performed automatically in response to a change in one or more of the parameters 318 and/or 320 in one or more of devices 302, 304, and 306. The determining and/or detecting may be performed automatically in response to a reconfiguration of the network path. The notification may comprise a recommended configuration of the one or more parameters 318 and/or 320 in one or more of devices 302, 304, and 306. The one or more circuits and/or processors may enable access to one or more application programming interfaces of one or more of devices 302, 304, and 306. The one or more circuits and/or processors may be operable to translate between the one or more application programming interfaces and one or more network interfaces.

The one or more circuits and/or processors may be operable to configure of the one or more parameters in a first portion, such as a first one of devices 302, 304, and 306, of the plurality of devices 302, 304, and 306. The one or more circuits and/or processors may be operable to communicate with one or more other circuits and/or processors such as any of LPMs 312a, 312b, and 312c or a combination thereof, that manage configuration of the one or more parameters in a second portion of the plurality of devices, such as a second one of devices 302, 304, and 306. The one or more circuits and/or processors may be operable to automatically perform the determining and/or detecting in response to a communication from the one or more other circuits and/or processors. Incompatibilities between parameters 318 and/or 320 in the first portion of the plurality of devices and parameters in the second portion of the plurality of network devices may be reconciled via communications between the one or more circuits and/or processors and the one or more other circuits and/or processors.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for matching and repairing network configuration.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking comprising:
   determining a configuration of one or more parameters in a plurality of devices along a network path, wherein said devices comprise at least one server and one or more of a network switch, a network bridge, or a router;
   detecting an incompatible configuration in which any of said one or more parameters in any of said plurality of devices is configured such that communication between said plurality of devices is disabled or sub-optimal; and
   in instances that one or more parameters are configured such that communication between said plurality of devices is disabled or sub-optimal:
   communicating a notification of said incompatible configuration to a plurality of network management entities, each network management entity including a processor for processing data;
   among processors of the plurality of network management entities, automatically negotiating a reconfiguration of said one or more parameters to re-enable or optimize communication between said plurality of devices; and from at least one of the plurality of network management entities, automatically generating one or more messages to reconfigure said one or more parameters in one or more of said plurality of devices and communicating the one or more generated messages to the one or more of said plurality of devices.

2. The method according to claim 1, comprising automatically performing one or both of said determining and said detecting in response to a change in one or more of said parameters in one or more of said plurality of devices.

3. The method according to claim 1, comprising managing configuration of said one or more parameters in a first portion of said plurality of devices via hardware, software, or hardware and software in said first portion of said plurality of devices.

4. The method according to claim 3, comprising managing configuration of said one or more parameters in a second portion of said plurality of devices via hardware, software, or hardware and software in said second portion of said plurality of devices.

5. The method according to claim 4, comprising automatically performing one or both of said determining and said detecting in response to network communications between said hardware, software, or hardware and software in said first portion of said plurality of devices and said hardware, software, or hardware and software in said second portion of said plurality of devices.

6. The method according to claim 4, wherein incompatible configurations between said one or more parameters in said first portion of said plurality of devices and said one or more parameters in said second portion of said plurality of devices are reconciled via network communications between said hardware, software, or hardware and software in said first portion of said plurality of devices and said hardware, software, or hardware and software in said second portion of said plurality of devices.

7. The method according to claim 1, wherein said notification comprises a recommended configuration of said one or more parameters in one or more of said plurality of devices.

8. The method according to claim 1, comprising enabling access, via one or more network interfaces, to one or more application programming interfaces of one or more of said plurality of devices.

9. The method according to claim 8, comprising translating between said one or more application programming interfaces and said one or more network interfaces.

10. The method according to claim 1, comprising automatically performing one or both of said determining and said detecting in response to a reconfiguration of said network path.

11. A system for networking comprising:
one or more circuits that are operable to:
determine a configuration of one or more parameters in a plurality of devices along a network path, wherein said devices comprise at least one server and one or more of a network switch, a network bridge, or a router;
detect an incompatible configuration in which any of said one or more parameters in any of said plurality of devices is configured such that communication between said plurality of devices is disabled or sub-optimal; and
in instances that one or more parameters are configured such that communication between said plurality of devices is disabled or sub-optimal, perform:
communication of a notification of said incompatible configuration to a plurality of network management entities;
automatic negotiation among the plurality of network management entities of a reconfiguration of said one or more parameters to re-enable or optimize communication between said plurality of devices; and
automatic generation and communication of one or more messages from at least one of the plurality of network management entities to one or more of said plurality of devices, the generated messages to reconfigure said one or more parameters in the one or more of said plurality of devices.

12. The system according to claim 11, wherein said one or more circuits are operable to automatically perform one or both of said determining and said detecting in response to a change in one or more of said parameters in one or more of said plurality of devices.

13. The system according to claim 11, wherein a first portion of said one or more circuits is operable to manage configuration of said one or more parameters in a first portion of said plurality of devices.

14. The system according to claim 13, wherein a second portion of said one or more circuits is operable to manage configuration of said one or more parameters in a first portion of said plurality of devices.

15. The system according to claim 14, wherein said one or more circuits are operable to automatically perform one or both of said determining and said detecting in response to network communications between said first portion of said one or more circuits and said second portion of said one or more circuits.

16. The system according to claim 14, wherein incompatibilities between said one or more parameters in said first portion of said plurality of devices and said one or more parameters in said second portion of said plurality of devices are reconciled via said network communications between said first portion of said one or more circuits and said second portion of said one or more circuits.

17. The system according to claim 11, wherein said notification comprises a recommended configuration of said one or more parameters in one or more of said plurality of devices.

18. The system according to claim 11, wherein said one or more circuits enable access, via one or more network interfaces, to one or more application programming interfaces of one or more of said plurality of devices.

19. The system according to claim 18, wherein said one or more circuits are operable to translate between said one or more application programming interfaces and said one or more network interfaces.

20. The system according to claim 11, wherein said one or more circuits are operable to automatically perform one or both of said determining and said detecting in response to a reconfiguration of said network path.

* * * * *